Aug. 2, 1932.  H. C. RICHARDSON  1,869,506
METHOD OF AND APPARATUS FOR MOORING AN AIRPLANE
WHILE IN FLIGHT TO ANOTHER AIRCRAFT
Original Filed Oct. 23, 1925  5 Sheets-Sheet 4

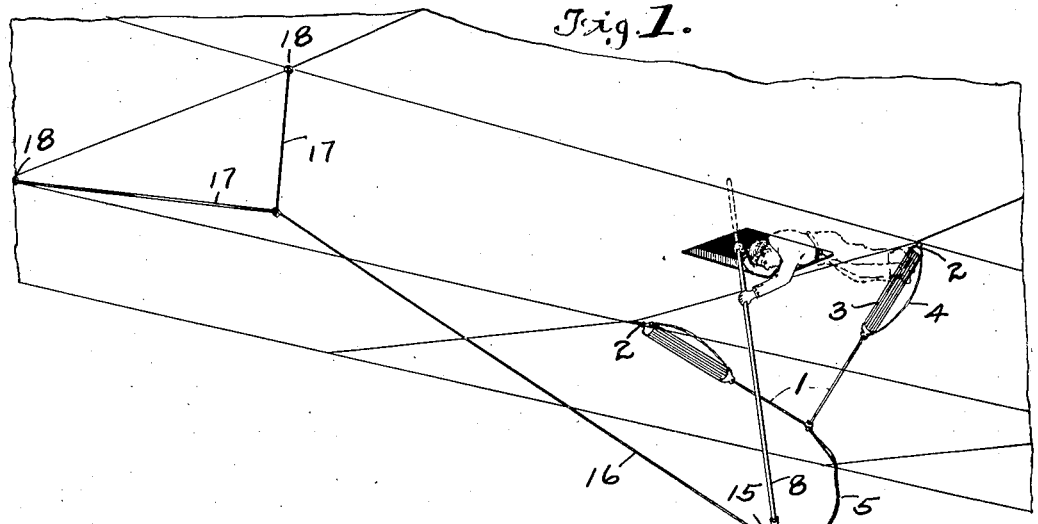

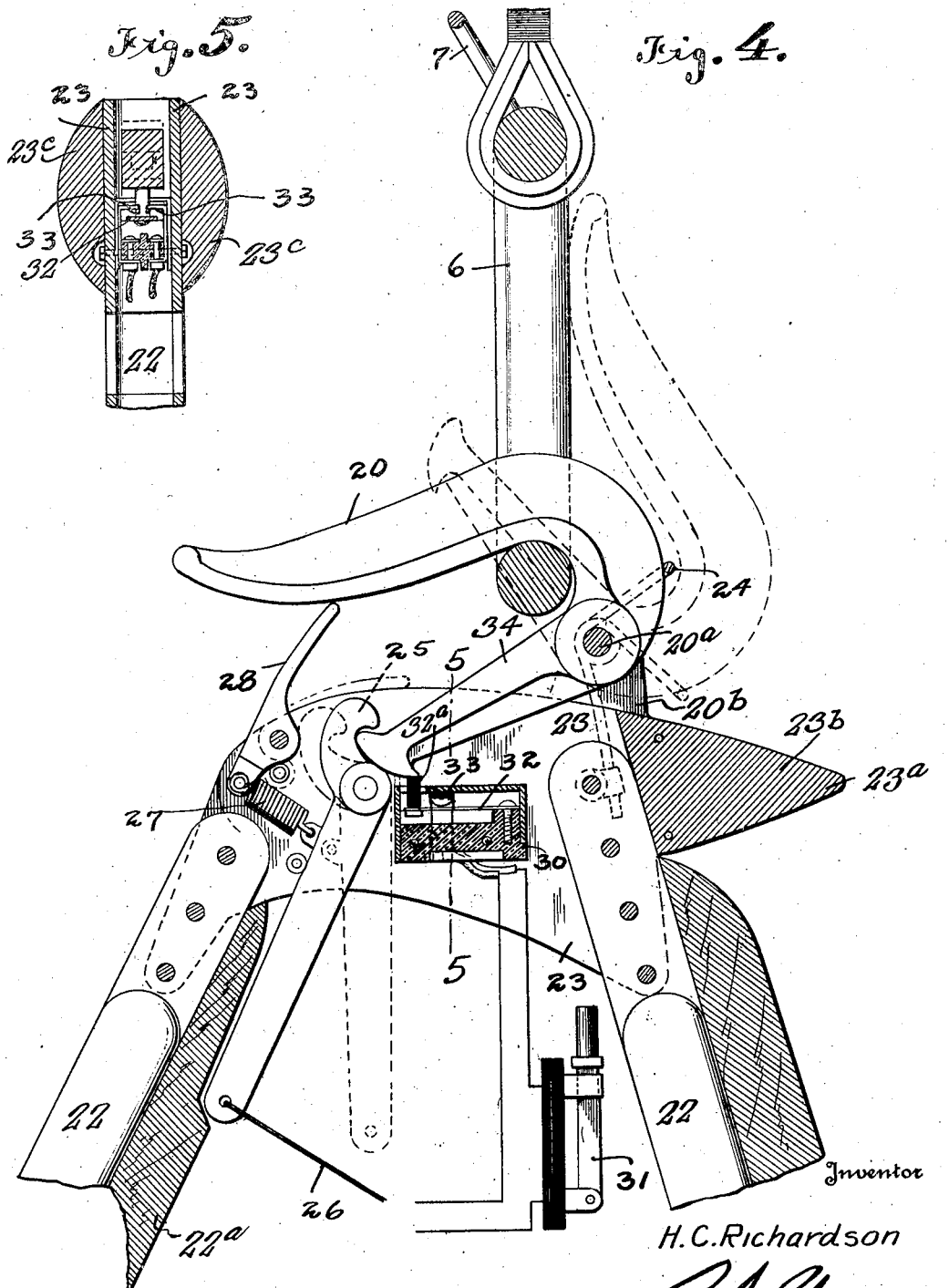

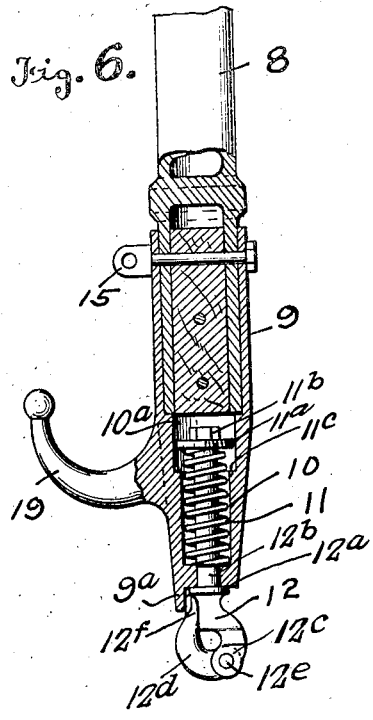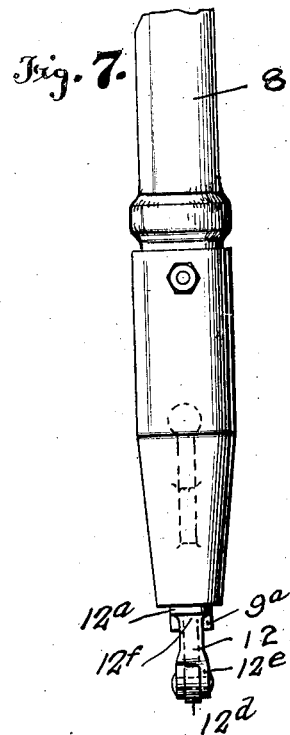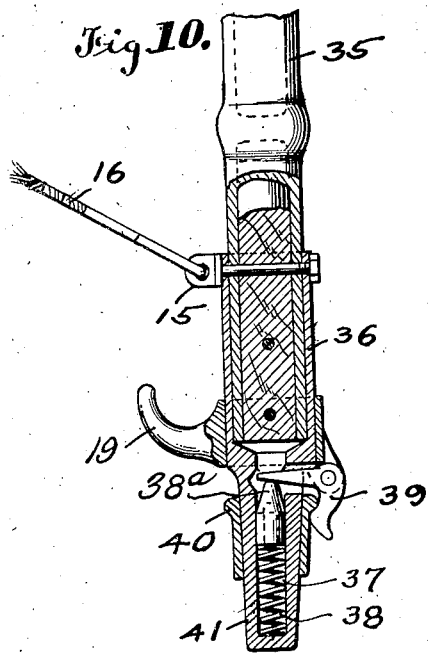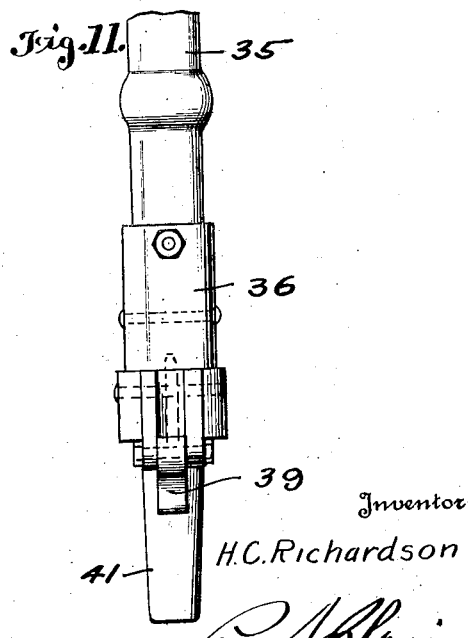

Inventor
H.C. Richardson
By
Attorney

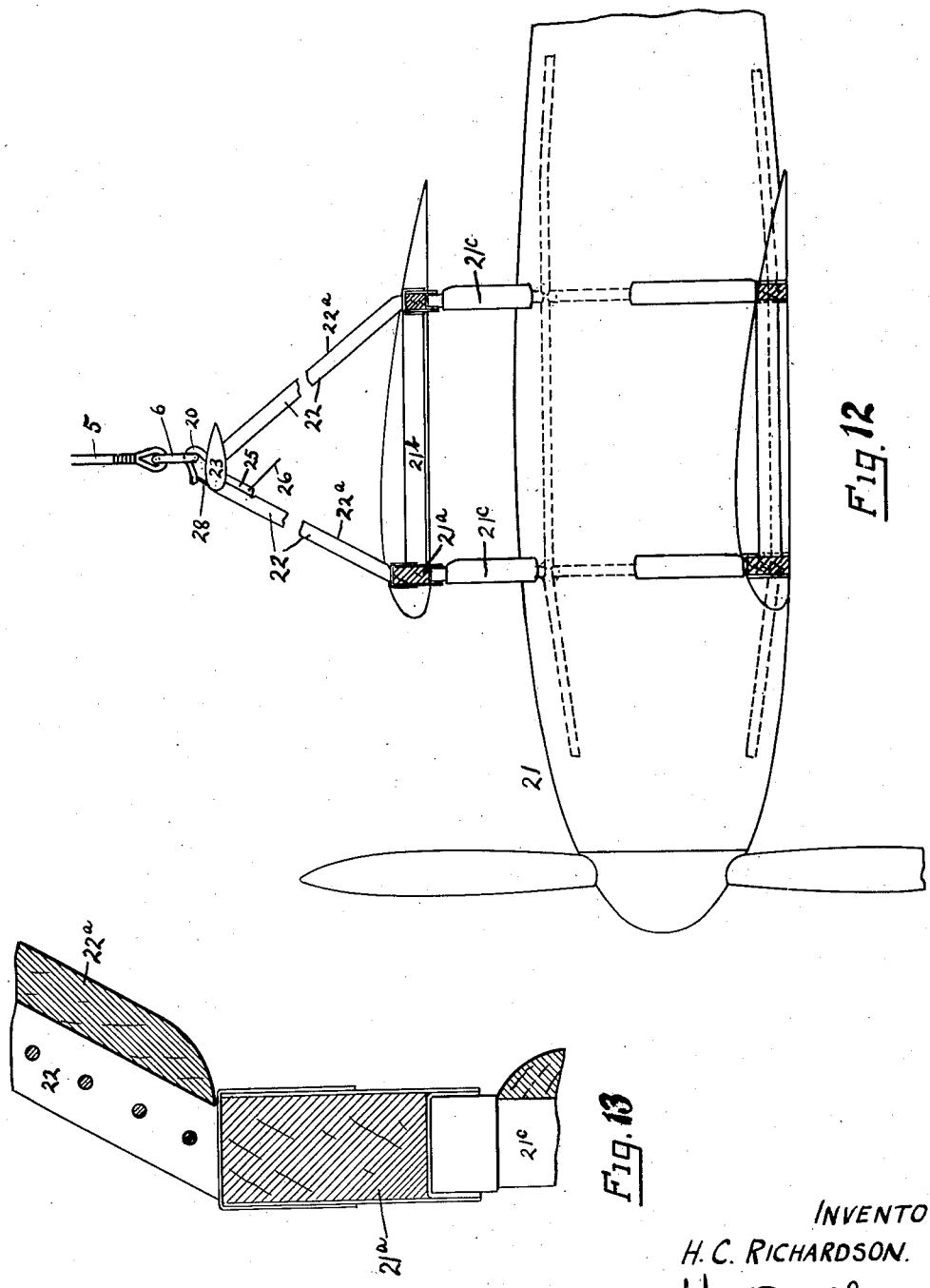

Patented Aug. 2, 1932

1,869,506

UNITED STATES PATENT OFFICE

HOLDEN C. RICHARDSON, OF CLEVELAND, OHIO

METHOD OF AND APPARATUS FOR MOORING AN AIRPLANE WHILE IN FLIGHT TO ANOTHER AIRCRAFT

Application filed October 23, 1925, Serial No. 64,320. Renewed July 9, 1929.

(GRANTED UNDER THE ACT OF MARCH 3, 1883, AS AMENDED APRIL 30, 1928; 370 O. G. 757)

This invention relates to an apparatus for catching airplanes while in flight from other aircraft and more particularly to permit an operator from within a dirigible to catch and temporarily suspend an airplane from the under side thereof.

Heretofore in mooring an airplane to a dirigible or other object great difficulty has been experienced due to the pilot of the plane, or the pilots of the dirigible and the plane, being responsible therefor, because maneuvering of such craft has heretofore been solely depended upon to bring the craft into mooring association. Such difficulty is accentuated by the location of the plane mooring upon or above the upper wing out of sight of the pilot of the plane, while the mooring of the dirigible is also out of sight, usually, of its pilot.
Even when a mooring may be made under such difficulties excessive jarring and strains have been placed upon such craft and said mooring due to the navigating power, for instance of the airplane, exerting strains upon the mooring for a substantial period before the same may usually be manually shut off, and which jarring and strains are so substantial as to endanger either or both craft and require the moorings of each craft to be of such greater strength and weight as to unduly cumber both craft.

The object of this invention is to provide an improved method and apparatus for catching airplanes from other craft while in flight and which overcomes for the first time in the art each of said difficulties, undue encumbering and the liabilites attending each of the same.

To attain these and other objects, and in accordance with the general features of this unitary and related invention, my improved method contemplates a mooring upon the dirigible or other object and upon the airplane, relatively maneuvering said dirigible or other object and said plane into its mooring relation, and manually associating said moorings. With said method, but with or without the manual element of said association, I contemplate the further step of shutting off the navigating power of said plane substantially simultaneously with said mooring and preferably by the stress of said mooring, which stress may include the checking of the velocity of the plane.

My said method may further include the step of manually controlling either from the dirigible or other object or from the plane, and may include the step of releasing said manual control from the mooring when made; and that each of said steps may be associated in my method either with or without said step of shutting off said navigating power.

To demonstrate the practical utility of my said method, a related, improved and novel apparatus, embodying my invention, and which may be used most advantageously, certainly and efficiently in practicing said improved method as a unitary invention, is provided to also serve as an example, to those skilled in the art, of the facility with which, after becoming familiar with my invention, the many forms and kinds of existing apparatus, with or without substantial modification, may be employed in the efficient practice of my said method and each of the several steps thereof.

Said provided apparatus contemplates and includes projecting or projectable associatable mooring means separately carried by the dirigible or other object and by the plane with means for securing together said separate mooring means upon their association; and means for manually controlling the relative association of said mooring means into securing association.

I prefer to manually control said securing association of said mooring means from a point on said dirigible or other object and more preferably by other than the pilot of the dirigible if such object be a dirigible or other aircraft.

I also prefer to provide, which may be employed when desired, means for releasing said manual control means from the mooring means when the mooring means are secured together.

I also provide means for preferably automatically shutting off the navigating power of preferably the plane, or craft moored below, substantially simultaneously with the securement together of the mooring means, and more preferably by the stress upon the mooring.

These and other objects of my invention will be more apparent from the following detailed description and the accompanying drawings, illustrating one embodiment of my invention in an improved apparatus, of the many different forms and characters of apparatus each of which may be employed in the practice of my invention.

The invention contemplates in its apparatus sense a manually operated target ring or mooring means for hooking on to an airplane from an airship or dirigible or other object and this is accomplished by means of a manually operated target ring controlled preferably from within the airship but in sight of the associatable mooring means on the craft to be moored to said controlled ring or mooring means.

The invention further contemplates a provision of means for preferably automatically stopping the navigating power of the plane upon the securement of the mooring means, preferably by the stress upon the mooring; and more preferably by making a connection between the plane and airship by an electric switch located adjacent and operated by the hook or mooring means carried by the plane; and also a further means for launching while in flight by the use of a quick release device controlled by the operator of the plane.

A further object, in its apparatus sense, is to provide a mechanism adapted to relieve the pilot of the plane of a greater part of the anxiety in maneuvering a plane to hook onto an airship while in flight.

Other objects will be in part obvious and in part hereinafter pointed out in connection with the accompanying sheets of drawings illustrating various modifications of the invention and in the several views of which corresponding parts are indicated by similar reference characters.

In these drawings,

Figure 1 represents a portion of an airship and an approaching plane about to be secured by the target ring.

Figure 2 is a transverse view showing the effective radius in which the target ring may be operated to catch the hook mounted on the approaching plane.

Figure 3 is a side view of a plane equipped with a quick release suspension hook.

Figure 4 is an enlarged detail of the quick release suspension hook and a portion of its mounting.

Figure 5 is a section on the line 5—5 of Fig. 4, to more clearly bring out the circuit breaking switch.

Figures 6 and 7 are enlarged detail views of a detachable pole for the target ring.

Figures 10 and 11 are detail views of a modified form of detachable pole.

Figure 12 is a side elevation view of the airplane shown in Figure 1 and Figure 3, with portions of the wings broken away; and Figure 13 is an enlarged view showing the securement of the hook supporting standards to the plane structure.

Figure 8:
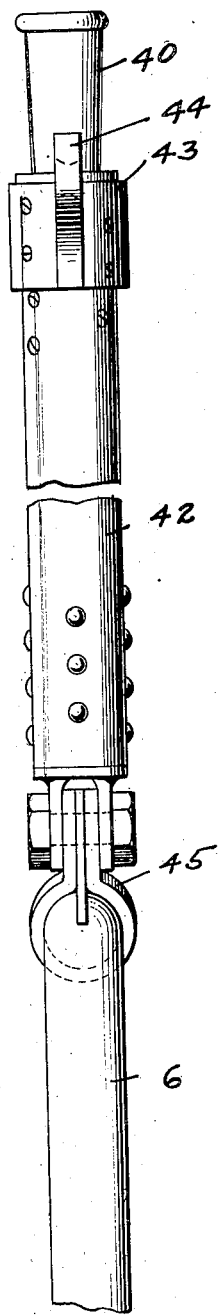
Figures 8 and 9 are detail views of a target ring, extension shaft and socket.

In order that a clearer initial perception of the present invention may be had it may be stated that it is conductive to most certain results in accomplishing a connection for the suspension of a plane from a dirigible or other object while in flight that the pilot of each craft should be relieved of the responsibility of making the connection, and that the pilot of the plane merely maneuvers the plane in the direction of flight of the airship at about the same or slightly greater speed, endeavoring to keep within a reasonable distance below the airship, while an operator within the airship, with a detachable pole carrying the target ring or mooring means, observes the approaching plane, steadies the ring, moving the ring up or down or to one side until the ring passes over the hook mounted on the plane. The contact of the ring and hook causes the circuit switch to break the ignition circuit and thus stop the engine of the plane, causing the plane to settle and be carried by the ring. The attachment to and settling down of the plane in the shock absorbing yoke causes the pole to be tripped from the ring and the operator then draws the pole up within the airship for storage.

Referring now to the drawings in detail and more particularly to Figure 1, the device consists of a suspension yoke of cable 1 attached to the frame structure of an airship at substantially separated points 2 and is provided with shock absorbing members 3 each of which is secured at one end to said ship or other object at 2, and each of whose remaining ends is secured to cable 1 at a point representing the safe extension limit of members 3, the parts of cable 1 intermediate the ends of each member 3 forming check cables 4. The cable yoke 1 terminates in a single member 5 attached thereto intermediate the adjacent ends of members 3 and which member 5 may be made of cable, rod or tubing for the purpose of supporting the target ring or mooring means 6. The target ring or mooring means 6 is of sufficient diameter to permit free access of the hook or mooring means 20 carried by the plane. The ring 6 is provided with an extension member 7, in the preferred form, for connecting the operating pole 8.

The pole 8 is to be made light in weight, preferably a bamboo pole, and has secured to the lower end a fitting 9, Fig. 6, having a bore 10 for housing a compression spring 11, which exerts sufficient pressure on the latch or hook member 12 to hold the ring 6 in a suspended position.

Hooked member 12 is provided with a shoulder 12a from which extends an integral stem 12b provided with a slidable bearing in the end wall of fitting 9. Stem 12b extends into and preferably substantially throughout the length of bore 10 where it is surrounded by spring 11. The upper end of stem 12b is provided with a collar or washer 11a secured thereto by nut 11b, said collar 11a occupying an enlarged bore 10a of fitting 9, said spring 11 exerting its pressure between collar 11a and the bottom wall of fitting 9. Normally spring 11 holds shoulder 12a against the lower end of fitting 9, but when a substantial downward stress comes upon hooked member 12 spring 11 is compressed thereby, the limit of such compression being set by the contact of collar 11a with the shoulder 11c formed in fitting 9 between the adjacent ends of bores 10 and 10a. The hooked lower end of member 12 is preferably in two parts, in the form shown in Figures 6 and 7, 12c and 12d connected together by loose pivot 12e, while the upper end of 12f of movable element 12d of said hook is adapted to extend between, and be normally confined by, the adjacent portion of member 12 and a lug 9a projecting from the end of fitting 9. When the weight of the plane causes the ring to move downward, the hook portion 12d is drawn down against the tension of spring 11 until its end 12f becomes free from lug 9a and thus releases the ring from the pole. An eye bolt 15 is provided in the fitting 9 for securing thereto a cable 16, the other end of which is secured by elastic cords 17 or springs forming a yoke whose upper ends are secured to the frame structure of the airship at substantially separated points forward as at 18. The purpose of the cable 16 is to relieve the operator of the wind load on the pole. A hook 19 is provided on the fitting 9, to be used for hauling the suspension device up to the hatch for storage and for the attaching of the ring.

The air plane, Figure 4, is to be equipped with a suspension hook or mooring means 20, mounted upon pivot pin 20a which is secured to, and above the center of, gravity of the plane 21, said hook or mooring means 20 preferably is formed of a single member having relatively long integral jaws open at the front and closed by an integral rear wall uniting said jaws together. Said pivot pin or member 20a is preferably located in the lower jaw, and near the back end, of hook or moring means 20, and is supported on lugs 20b extending above the rearward portion of oppositely located plates 23 separated by and secured to the upper ends of preferably metallic struts 22 by rivets or other suitable means.

The struts 22 are closest together at their upper ends, and extend downwardly at a substantial angle toward the front and rear respectively, while the front end of plates 23 are curved downwardly and terminate in the plane of the front edges of the front struts 22. The upper jaw of hook or mooring means 20 is curved upwardly and terminates in a plane substantially forward of the plane of the front edges of the forward struts 22. By this construction the ring or mooring means 6 may strike the front edge of forward struts 22, or the curved forward upper edges of plates 23, or the curved front lower surface of the upper jaw of hook or mooring means 20, the same will in any such case be, by said surfaces, directed into the relatively long slot between the upper and lower jaws of hook or mooring means 20. The front end of the lower jaw of the hook is located in a streamline housing formed between the separated side plates 23. The hook 20 is normally held in a closed position by spring 24 preferably coiled about the pivot 20a and whose ends are respectively hooked over the back edges of hook 20 and secured to a plate 23, said hook being held in a locked position by a trip latch 25 which is pivoted between plates 23 and is manually operated when it is desired to release the plane for another flight by means of a cable 26, or the like secured to its lower end and extending within convenient reach of the pilot of the plane. The trip latch 25 is held in a locked position by a spring 27 which has the dual purpose of holding the trip latch 25 and the safety finger 28 in place to prevent the ring 6 from jumping out of the hook 20 in case of a rebound caused for instance by the shock absorber yoke 1, in making a connection.

A switch 30 is provided to short circuit the primary of the transformer switch in the ignition circuit. An auxiliary switch 31, provided to eliminate the effect of switch 30 is located in a position convenient to the pilot of the plane and controls the circuits of the ignition system of the plane. Switch 31 places this ignition system in a desired condition preparatory to the launching of the plane from the dirigible and in a desired condition preparatory to again mooring the plane to the dirigible, depending upon its open or closed position. The spring 24, causes the arm 34 of the hook 20 to force the contact spring 32 away from the terminal 33 until the weight or stress of the plane comes on the ring 6 and takes up the play between the arm 34 of hook 20 and the latch lever 25.

When the plane is in flight and with the engine running, switch 30 remains open due to the effect of spring 24 upon hook 20. When the target ring 6 passes over the safety finger 28 and into engagement with hook 20 the weight or stress of the airplane, thus localized above the pivot point of hook 20 then rotates hook 20 about its axis raising the arm 34 of hook 20 into engagement with safety latch 25. This movement allows contact 32 to rise by its own resilience, making contact with point 33 thereby shorting the primary of the ignition transformer of the airplane engine.

When the pilot desires to take off, switch 31 is opened, thereby eliminating the shorting effect of switch 30 and allowing the engine to be started preparatory to flight. Trip latch 25 is released by means of a pull exerted upon cable 25 when the take-off is made.

Switch 31 is closed prior to attaching the airplane to the dirigible again and the ignition circuit and parts of the airplane engine are then in such a position that the above described method of attaching the airplane to the dirigible may be repeated.

In the modified form of device, shown in Figures 10 and 11, the pole 35 is connected, by means of a fitting 36 having the recess 37 for housing the compression spring 38 but is provided with slightly different latch element 39. The latch 39 in this instance is pivotally mounted intermediate its ends to fitting 36. One end of latch 39 extends into a bore in the fitting 36 and engages a plunger 38a pressed by spring 38, while the remaining end is adapted to be hooked over the flanged upper edge of a cup-shaped member 40 which fits over the tapered lower portion 41 of the fitting 36. Member 40 is secured by suitable means to ring or mooring means 6. The operation of the release is similar to the previous form.

Figure 9:
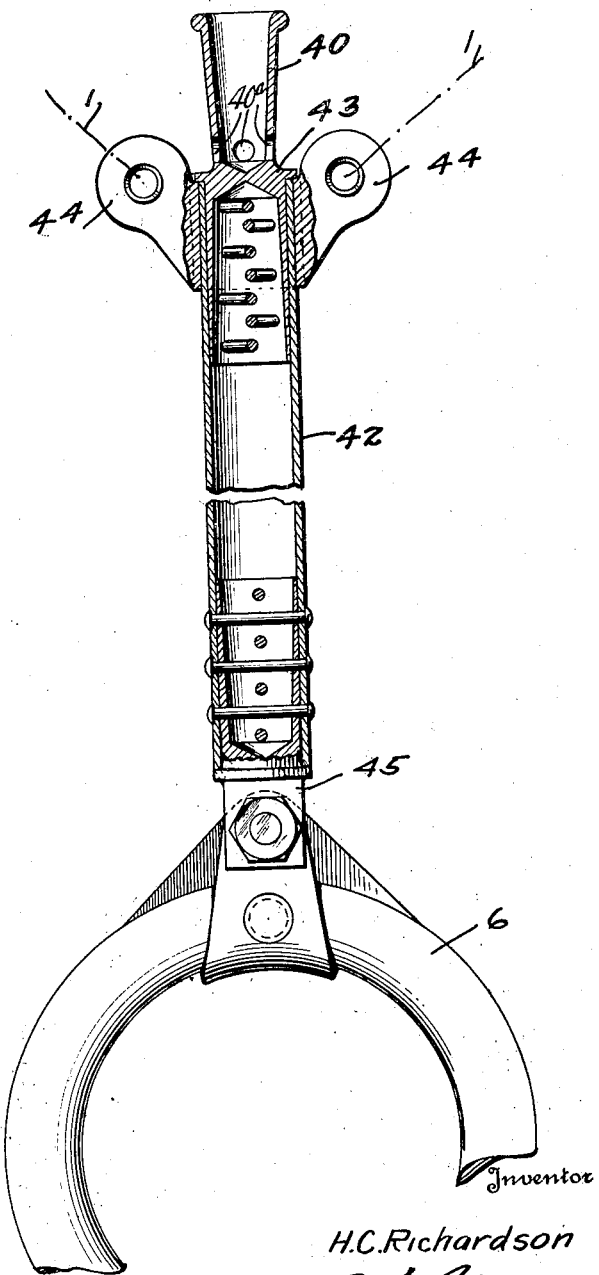

In this arrangement for the flexible cable 5 is substituted a rigid member in the form of a rod or tubing member 42, Figures 8 and 9. The member 42 has secured to its upper end and provided with openings 40a at its bottom for the escape of moisture or particles which may interfere with the insertion of tapered portion 41 in the bore of member 42. The fitting 43 which is integral with the pole socket 40 and has secured to its outer portion a sleeve on which the suspension lugs 44 are formed for connecting the suspension yoke cables 1 while at the lower end the member 42 has rigidly secured thereto by suitable fittings the suspension target ring or mooring means 6.

The electric switch means 30 is mounted between the separated plates 23 to protect the same, as shown in Figure 4. The contact members 32 and 33 are mounted within the switch housing and resilient member 32 has secured to its free end an insulating projection 32a extending through a slot in said housing and is adapted to contact at its upper end with the lower forward portion of the lower jaw of hook or mooring means 20, and which projection 32a prevents the short circuit of the electric current at other times than when members 32 and 33 are not in contact.

To avoid the noise of the air currents, that are separated by plates 23 and struts 22 coming abruptly together in the rear, said plates are extended rearward to a tapered point 23a and connected by a similar shaped block 23b secured therebetween, while struts 22 are each provided with suitably secured rear tapered wood portions 22a.

The lower ends of struts 22 are suitably secured to the plane, preferably to the framework thereof, for instance, as shown in Figures 12 and 13, wherein 21a are the wing frame cross members connected by members 21b, while members 21a are in turn connected to the other parts of the craft by struts 21c as is usual with such craft.

The connection of the cable 5, or parts 44, to cable 1, intermediate the spreading shock absorbing members 3, enables the velocity of the plane 21 to be efficiently checked by both said members 3, and if the direction of flight of plane 21 at the time of its mooring, be at other than a right angle, to a plane extending between the points 2, one or the other of members 3 will receive the greatest initial stress upon the mooring of the plane 21.

It is believed that the operation of the device will be clear from the above description but a brief statement thereof is as follows:—

By referring to Figure 1 it will be seen that the airplane 21 is maneuvered to a position substantially below the midship section of the dirigible and at substantially the same speed whereby the operator on the dirigible moves the target ring 6 into engagement with the hook 20, shown in detail in Figure 4.

As soon as this snaps into place and a pull is exerted on the ring 6 the same becomes automatically disconnected from the pole by reason of the construction shown in Figures 6 and 7, for example, and the airplane remains suspended from the lines 5 and 16.

It will thus be seen that the present invention contemplates a simple and practical apparatus whereby aircraft may be launched from or caught by dirigibles and is well adapted to accomplish, among others, all of the objects and advantages herein set forth.

The invention herein described may be manufactured and used by or for the Government of the United States for governmental purposes without the payment to me of any royalty thereon or therefor.

What I claim is:—

1. In combination, a target ring flexibly and yieldingly supported from a dirigible, a detachable coupling for maneuvering said ring and a hook carried by an airplane adapted to be caught by said ring whereby the airplane may be suspended from said dirigible.

2. In combination, a target ring flexibly and yieldingly supported from a dirigible, a detachable coupling for maneuvering said ring, a hook carried by an airplane adapted to be caught by said ring whereby the airplane may be suspended from said dirigible, and means operable by the pilot of the plane for releasing said hook to permit the airplane to be launched from the dirigible.

3. In an apparatus of the character described, in combination, a target ring yieldingly supported from the under side of a dirigible, a detachable connection whereby said ring may be moved, a hook adapted to be carried by an airplane and engaged by said ring, means for releasing said hook to permit launching the airplane from the dirigible.

4. In an apparatus of the character described, in combination a target ring yieldingly supported from the under side of a dirigible, a detachable connection whereby the ring may be moved, a hook carried by an airplane and engageable by the ring, a circuit upon the airplane including means for stopping the engine automatically when the weight of the airplane rests upon the hook, means permitting the starting of the engine of the airplane and means for releasing the hook to permit the launching of the airplane from the dirigible.

5. The method of mooring aircraft in flight to an object and provided with moorings respectively on top of said craft and beneath said object, including the steps of maneuvering said craft relative to and below said object and thereby bringing said moorings as nearly as may be in intersecting paths and independently substantially universally manually maneuvering the interception of said moorings.

6. The method of mooring aircraft in flight to an object and provided with moorings respectively on top of said craft and beneath said object, including the steps of maneuvering said craft relative to and below said object and thereby bringing said moorings as nearly as may be in intersecting paths, and from said object and in view of said moorings independently substantially universally manually maneuvering the interception of said moorings.

7. The method of mooring aircraft to an object, including the steps of maneuvering said craft relative to said object, mooring said craft to said object, and shutting off the navigating power of said craft by stress on said mooring.

8. With the method of claim 5 the further step of shutting off the navigating power of said craft, by stress on said mooring.

9. With the method of claim 6 the further step of shutting off the navigating power of said craft, by stress on said mooring.

10. With the method of claim 5 the further step of associating a manual control with one of said moorings for effecting said manual maneuver.

11. With the method of claim 6 the further step of associating a manual control with the mooring of said object for effecting said manual maneuver.

12. With the method of claim 7 the further step of associating a manual control with one of said moorings.

13. With the method of claim 7 the further step of associating a manual control with the mooring of said object.

14. With the method of claim 5, the further steps of associating a manual control with one of said moorings for effecting said manual maneuver, and disassociating the manual control upon the completion of said mooring.

15. With the method of claim 5, the further steps of associating a manual control with one of said moorings for effecting said manual maneuver, and disassociating the manual control substantially simultaneously with the completion of said mooring.

16. With the method of claim 5, the further steps of associating a manual control with one of said moorings for effecting said manual maneuver, and dissociating the manual control by stress upon said mooring.

17. With the method of claim 7, the further steps of associating a manual control with one of said moorings and disassociating the manual control upon the completion of said mooring.

18. With the method of claim 7, the further steps of associating a manual control with one of said moorings and disassociating the manual control substantially simultaneously with the completion of said mooring.

19. With the method of claim 7, the further steps of associating a manual control with one of said moorings and disassociating the manual control by stress upon said mooring.

20. The method of mooring two aircraft together while in flight, including the steps of relatively associating such craft and their moorings, and shutting off the navigating power of one of such craft by said mooring.

21. An aircraft having a trapeze construction adapted to be retractably suspended therefrom and extending below the same and whose lower portion is movable in all directions, control means adapted to be associated with the lower portion of said construction for moving the same in all directions, and relatively rigid means adapted to be extended from the aircraft in association with said control means whereby said control means may be manually variably operated from within the aircraft to maneuver the lower portion of said construction in all directions.

22. An aircraft having a trapeze construction secured thereto and extendible therefrom and whose outermost portion is movable in all directions, and control means associated with the outermost portion of the extendible part of said construction and with said craft for variably maneuvering said outermost portion of said construction in all directions into engagement with another object.

23. An aircraft having a trapeze construction secured thereto and extendible therefrom and whose outermost portion is movable in all directions, a manually operable rod, and means for connecting said rod to the outermost portion of the extendible part of said construction for controlling the same into engagement with another object.

24. An aircraft having a trapeze construction suspended therefrom and extending below the same and whose outermost portion is movable in all directions, control means associated with and connected to the outermost portion of said construction, means adapted to extend from the aircraft and be connected to said control means whereby said control means may be manually operated to control the outermost portion of said construction in all directions, and means for disconnecting at said connection said control means from said second named means.

25. An aircraft having a trapeze construction secured thereto and extendible therefrom and whose outermost portion is movable in all directions, control means associated with and connected to the outermost portion of said construction and with said craft for controlling in all directions prior to mooring said outermost portion of said construction into mooring engagement with another object, and means for disconnecting at said connection said control means from said construction upon the occurrence of any substantial stress upon the connection between said outermost portion and control means.

26. An aircraft having a trapeze construction secured thereto and extendible therefrom and whose outermost portion is movable in all directions, a manually operable rod adapted to be normally within and abnormally extendible from said craft, means for connecting said rod to the outermost portion of said construction for controlling the same in all directions into engagement with another object, and means for disconnecting said rod from said construction at said connecting means.

27. An aircraft having a trapeze construction suspended therefrom and extending below the same and whose outermost portion is movable in all directions, variable control means connected to the outer portion of said construction, means whereby while in flight said control means may be manually operated in all directions from a point on the aircraft from which said construction may be viewed to maneuver the position of the outer portion of said construction and with the craft maneuvering to contribute to a mooring to an object, and means whereby a stress upon said control means may be counteracted.

28. An aircraft having a trapeze construction secured thereto and extendible therefrom and whose outermost portion is movable in all directions, a manually variable operable rod, means for rigidly connecting said rod to the outermost portion of said construction for moving the same in all directions and thereby controlling the same into engagement with another object independent of the aircraft maneuvering, and means whereby a stress upon said rod may be counteracted.

29. A dirigible having an opening therein, mooring means secured thereto relatively adjacent said opening and having a free end, and means supplementing of the maneuvering of the dirigible for maneuvering the position of the free end of said mooring means in all directions into a mooring engagement with an independent mooring means.

30. The structure of claim 29, with means for counteracting stress upon said maneuvering means.

31. The structure of claim 29, with means for connecting said maneuvering means to a portion of said mooring means.

32. The structure of claim 29, with cooperable coupling means on said mooring means and said maneuvering means for connecting and disconnecting said means.

33. The structure of claim 29, with means for connecting said maneuvering means to a portion of said mooring means and said mooring means being adapted to be moved in all directions by the maneuvering means in attaining mooring engagement, and coupling means having cooperable elements thereof respectively associated with said mooring and maneuvering means for connecting said means by the operation of said maneuvering means and for disconnecting said elements by stress upon said maneuvering means.

34. A dirigible having mooring means secured thereto and an opening adjacent said means, control means extendible through said opening, and coupling means comprising cooperable coupling elements respectively on each of said means for connecting and disconnecting said control and mooring means for the dirigible during flight.

35. A dirigible having mooring means secured thereto and an opening adjacent said means, control means extendible through said opening, means for connecting said control and mooring means from the dirigible during flight, and means for disconnecting said control and mooring means by stress upon said control means.

36. In aircraft mooring means adapted to safely moor an aircraft, while in flight, to an object the combination of an aircraft having an integral member positioned above the upper portion and near the vertical gravity plane of said aircraft and provided with a slot open at its end extending in the direction of flight and adapted to receive in said open end, while in flight, a mooring from an object; upwardly extending means secured to said upper portion and whose forward face is unobstructed and extends rearwardly and normally into the mouth of said slot, and to the upper portion of which means said member is pivotally mounted in said position; and means for locking said member from pivotal movement.

37. In aircraft mooring means adapted to safely moor an aircraft, while in flight, to an object, the combination of an aircraft having a cockpit and an integral member provided with a slot open at its front end extending toward the direction of flight and adapted to receive in said open end, while in flight, a mooring from an object; upwardly extending means rigidly secured to, and whose forward face is unobstructed and extends rearwardly and continuously from, the upper portion of said craft, and to the upper portion of which means the rear portion of said member is pivoted at a point near the longitudinal gravity center of said aircraft; means for locking said member from pivotal movement, and means extending from said locking means toward the cockpit of the aircraft for unlocking said locking means.

38. The separate structure of claim 36, with means for unlocking said member.

39. The separate structure of claim 36, with means for providing a flare to the open end of said slot with the forward surface of said extending means forming a portion of said flare.

40. The separate structure of claim 36, with means for permitting entry to and normally preventing exit from said slot.

41. The separate structure of claim 36 characterized by the pivot of said member being at a point near the rear end of said slot and by the forward end of the upper portion of said member extending in advance of the point where the forward face of said extending means normally enters the mouth of said slot.

42. Aircraft mooring means including means for movably mounting said means on said craft, and means for normally holding said mooring means in one position in said mounting means and for permitting limited movement of said mooring means relative to said mounting means by the mooring stress.

43. The structure of claim 42 with means for shutting off the navigation power of said craft by said movement of said mooring means occasioned by the mooring stress.

44. The separate structure of claim 36, with yieldable means mounted on said craft and normally extending across said slot, for permitting free entry of the mooring while in flight to and normally preventing its exit from said slot.

45. The separate structure of claim 36, with spring controlled means pivotally mounted independent of and below said member and extending across said slot at an angle away from the open end of said slot.

46. The method of mooring two aircraft together while in flight with one of the craft having a projecting mooring and the other craft a projectable mooring and a rigid member, including the steps of extending the projectable mooring and the rigid member from its craft, maneuvering the craft with their respective moorings as near as may be into paths where their moorings may substantially intercept, and associating said moorings into actual mooring association by the manipulation in any required direction of one of said moorings with the aid of said rigid member extended from a point on said other craft where both moorings are observable.

Signed at Washington, District of Columbia, this 26th day of June, 1925.

HOLDEN C. RICHARDSON.